United States Patent [19]

Nagano

[11] Patent Number: 4,869,709
[45] Date of Patent: Sep. 26, 1989

[54] DRIVING GEAR FOR A BICYCLE

[75] Inventor: Masashi Nagano, Izumi, Japan

[73] Assignee: Shimano Industrial Company Limited, Osaka, Japan

[21] Appl. No.: 196,066

[22] Filed: May 19, 1988

[30] Foreign Application Priority Data

May 21, 1987 [JP] Japan ............................... 62-124336

[51] Int. Cl.$^4$ ............................................. F16H 55/30
[52] U.S. Cl. ..................................... 474/152; 474/161
[58] Field of Search ................................... 474/77–79, 474/152, 161, 162

[56] References Cited

U.S. PATENT DOCUMENTS

| 3,257,860 | 6/1966 | Runde et al. | 474/161 X |
| 3,990,136 | 11/1976 | Hishida | 474/161 X |
| 4,589,860 | 5/1986 | Brandenstein et al. | 474/161 X |

FOREIGN PATENT DOCUMENTS 610805 9/1931 Japan .
415272 of 1934 United Kingdom .
481838 of 1938 United Kingdom .
1060084 2/1967 United Kingdom .
1077462 7/1967 United Kingdom .
1545977 5/1979 United Kingdom .

Primary Examiner—Thuy M. Bui
Attorney, Agent, or Firm—Stevens, Davis, Miller & Mosher

[57] ABSTRACT

A driving gear for a bicycle is provided which comprises a gear body provided with a large number of teeth and a support member supporting the gear body. Between the gear body and the support member there is provided a driving transmission for transmitting a driving force from one of the gear body and support member to the other. A gap is provided at the driving force transmission through which the gear body and support member are rotatable relative to each other by a predetermined angle. At a location shifted from the driving force transmission there is provided an elastic member which compensates the gap and is elastically deformed when the gear body and support member rotate relative to each other so as to absorb the gap, thereby enabling the driving force to be transmitted from the driving force transmission.

11 Claims, 6 Drawing Sheets

DRIVING GEAR FOR A BICYCLE

FIELD OF THE INVENTION

The present invention relates to a driving gear for a bicycle, and more particularly, to a driving gear for a bicycle, which is used as a front gear or a rear gear engageable with an endless transmitting member such as a driving chain or a toothed belt.

BACKGROUND OF THE INVENTION

In a front gear for a bicycle, a device for buffering an impact by a pedalling force (driving force) caused when a driver starts pedalling has hitherto been well-known as disclosed in Japanese Utility Model Publication Gazette No. Sho 6-10805.

Such conventional device is constructed such that a support member having a plurality of radially extending arms is mounted on a crank comprising a crank shaft and a pair of crank arms. A gear body is provided at its outer periphery with a large number of teeth and is supported rotatably relative to the crank. Between the support member and the gear body is provided a driving force transmitting elastic member, with the driving force of the crank being transmitting to the gear body through the elastic member, thereby buffering an impact caused by the driving force when pedalling starts.

Such conventional device, however, is provided at a driving force transmission for transmitting the driving force of the crank with an elastic member through which the driving force is transmitted to the gear body. In other words, the driving force is not directly transmitted to the gear body and always acts on the elastic member, thereby creating a problem in that the elastic member becomes fatigued easily.

SUMMARY OF THE INVENTION

A main object of the present invention is to provide a driving gear for a bicycle, which can buffer an impact caused by a driving force when the pedalling starts, and providing reduced fatigue in the elastic member for buffering the impact, thereby improving the durability of the elastic member and effectively ensuring the transmission of the driving force.

Another object of the invention is to provide a driving gear for a bicycle, which has an elliptic or an approximately elliptic gear body having a major axis and a minor axis and which can attain the above objective and reduce variations in chain tension during pedalling.

The present invention is characterized in that the driving gear is provided with a gear body having at its outer periphery a large number of teeth and a support member supporting the gear body. Between the gear body and the support member is provided a driving force transmission for transmitting the driving force from one of the gear body and support member to the other. The driving force transmission is provided with a gap through which the gear body and support member are rotatable relative to each other by a predetermined angle, and at a portion shifted from the driving force transmission is provided an elastic member which compensates the gap and is elastically deformed to absorb the gap, thereby absorbing the gap to enable the driving force to be transmitted from the driving force transmission.

In the above construction when pedalling starts, the elastic member is deformed by the driving force to an extent corresponding to the gap so as to buffer an impact caused by the driving force, whereby a cyclist experiences a good feel of pedalling. Also, the driving force can be transmitted from one of the gear body and support member directly to the other through the elastically deformed elastic member, resulting in the elastic member becoming less fatigued.

The present invention is further characterized in that the driving gear is provided with (1) an elliptic gear body having a major axis and a minor axis and at its outer periphery a large number of teeth and (2) a support member supporting the gear body. Between the gear body and the support member there is provided a driving force transmission for transmitting the driving force from one of the gear body and the support member to the other. The driving force transmission has a first gap through which the gear body and support member are rotatable relative to each other by a predetermined angle and a second gap which, when the major axis of the gear body is directed vertically, enables the gear body to be displaced longitudinally of the bicycle with respect to the support member. The driving gear is further provided at a portion shifted from the driving force transmission with an elastic member which, when the gear body and support member rotate relative to each other, is elastically deformed to absorb the first gap to enable the driving force to be transmitted from the driving force transmission.

Also, in such embodiment, similarly to the former embodiment, the elastic member can be elastically deformed to an extent corresponding to the first gap to buffer the impact when the initial pedalling starts, resulting in that the cyclist has a good pedalling feel and the elastic member absorbs the first gap to undergo reduced fatigue.

Furthermore, when the major axis of the gear body is horizontal, a transmission annulus is optimally tensile, whereby the gear body is displaced to an extent corresponding to the second gap longitudinally of the bicycle with respect to the support member when the major axis is directed vertically, thereby preventing variation in the chain tension of the driving chain.

In addition, in the above embodiment it should be noted the word "elliptic" is not limited to an ellipse having the major and minor axes and symmetrically with respect thereto.

The above and other objects of the invention will become more apparent from the detailed description and examples which follow.

BRIEF DESCRIPTION OF THE DRAWINGS

FIGS. 6 through 8 show a fifth embodiment, in which FIG. 6 is a partially cutaway front view corresponding to FIG. 1.

FIG. 7 is an enlarged sectional view of the principal portion only, and

FIG. 8 is a partial sectional view of an elastic member mounted to a gear body,

DETAILED DESCRIPTION OF THE INVENTION

Figure 1:
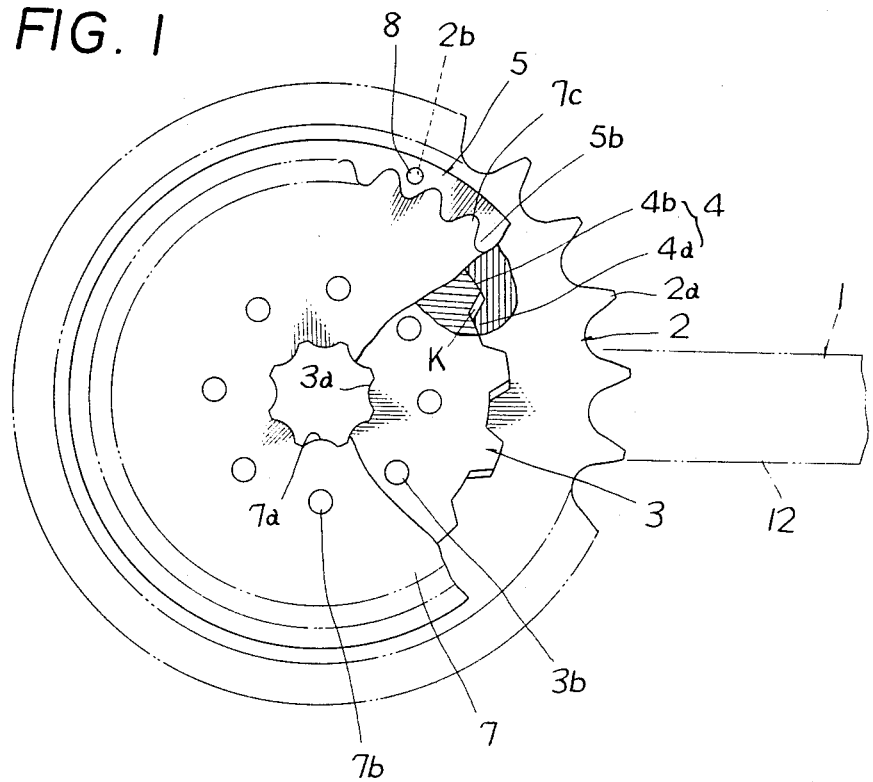
FIG. 1 is a partially cutaway front view of a first embodiment of a driving gear of the invention.
Figure 2:
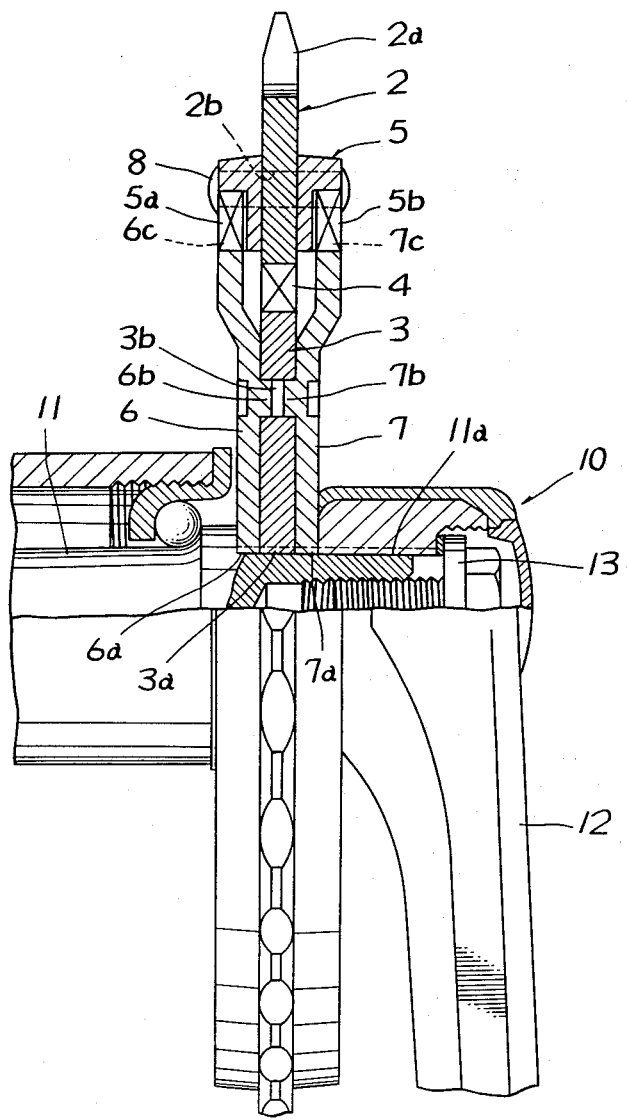
FIG. 2 is an enlarged longitudinal section side view of the FIG. 1 embodiment mounted on a crank.

The first embodiment of the driving gear of the invention shown in FIGS. 1 and 2 is a front driving gear 10 mounted to a fitting portion 11a of a crank 10 comprising a crank shaft 11 having a tapered fitting portion 11a at the outer periphery of the shaft end and a crank arm 12 detachably fitted into the fitting portion 11a. The driving gear comprises a ring-like gear body 2 having at its outer periphery a large number of teeth 2a and at its center a through bore, and a disc-like support member 3 supporting the gear body 2 insertably into the through bore and having at its center a mounting bore 3a to be fitted onto the fitting portion 11a. A driving force transmission 4, for transmitting a driving force of the crank 10 from the support member 3 to the gear body 2, is provided between the inner surface of the center bore of gear body 2 and the outer periphery of the support member 3. As shown in FIG. 1, a gap K, which makes the gear body 2 and support member 3 rotatable relative to each other by a predetermined angle, is provided at the driving force transmission 4, and a ring-like elastic member 5, which compensates the gap K and is elastically deformed to absorb the gap K when the gear body 2 and support member 3 rotate relative to each other to thereby enable the driving force to be transmitted from the driving force transmission 4, is provided at the portion shifting therefrom as described in detail below.

In the above construction, the driving force transmission 4, as shown in FIG. 1, comprises a plurality of transmitting teeth 4a provided at the inner surface of the through bore of gear body 2 and a plurality of transmitting teeth 4b provided at the outer periphery of the support member 3, with gap K being provided between the engaging surfaces of the respective transmitting teeth 4a and 4b.

The support member 3 is formed of a thick disc, and at the outer periphery thereof are provided the transmitting teeth 4b. A pair of reinforcement plates 6 and 7, having at their centers mounting bores 6a and 7a respectively, are attached to both sides of the support member 3 to thereby reinforce the support member 3 around a mounting bore 3a thereof. Plates 6 and 7 are larger in diameter than the support member 3 and are disposed opposite at their outer peripheries to both sides of the inner peripheral portion of the gear body 2. Plates 6 and 7 are provided at their outer peripheries with engaging teeth 6c and 7c engageable with engaging teeth 5a and 5b of elastic members 5, with elastic member 5 being provided between the outer peripheries of the reinforcement plates 6 and 7 and the inner peripheral portion of the gear body 2. In addition, the support member 3 is provided at radially intermediate portions thereof with a plurality of coupling bores 3b disposed circumferentially of the support member 3. Reinforcement plates 6 and 7 are provided with a plurality of coupling projections 6b and 7b to be fitted into the coupling bores 3b respectively, thereby improving the coupling strength of the support member 3 and reinforcement plates 6 and 7. In addition, such coupling means is not particularly defined or limited to the above construction.

Also, at the radially intermediate portions of the gear body 2 are provided a plurality of holding bores 2b disposed circumferentially of the gear body so as to hold the elastic members 5.

The elastic members 5 are ring-like plates of synthetic resin or rubber and are disposed at both sides of the gear body and mounted thereto through shafts 8 inserted into the holding bores 2b. At the inner periphery of the elastic members are provided a large number of engaging teeth 5a and 5b and at the outer peripheries of the reinforcement plates 6 and 7 are circumferentially provided a large number of engaging teeth 6c and 7c, so that the engaging teeth 5a and 6c and 5b and 7c engage with each other to transmit the driving force from the reinforcement plates 6 and 7 to each elastic member 5, thereby primarily deflecting the teeth 5a and 5b. Each elastic member 5 is interposed at an inner peripheral portion thereof between the gear body 2 and the reinforcement plates 6 and 7. Gaps are provided between the elastic member 5 and the reinforcement plates 6 and 7, so that, when the support member 3 rotates with respect to the gear body 2, rotational resistance can be reduced.

Figure 3:
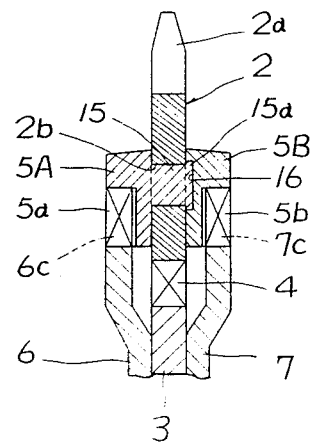
FIGS. 3 through 5 are enlarged sectional views of sound through fourth embodiments, showing principal portions only.
Figure 4:
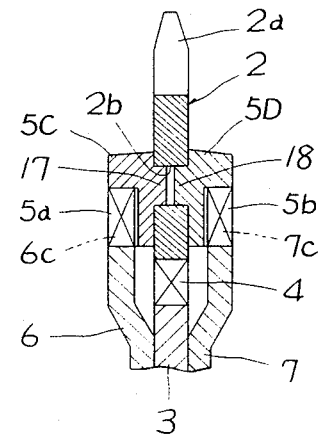
Figure 5:
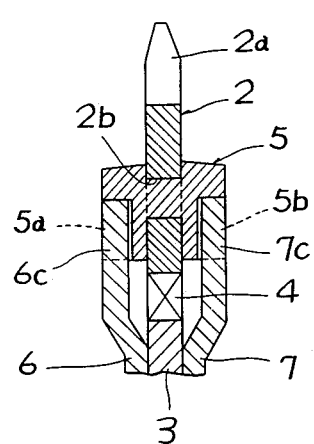

Each elastic member 5 is mounted to the gear body 2 through the shaft 8 caulked at both end edges thereof. Alternatively, for example, as shown in a second embodiment in FIG. 3, one elastic member 5A of two separate elastic members may be provided with fitting projections 15 each having at its utmost end a retaining portion 15a. Projections 15 are to be inserted into the holding bore 2b. The other elastic member 5B is provided with retaining bores 16 engageable with the retaining portions 15a so that the elastic members 5A and 5B may be mounted to the gear body 2 in this manner. As shown in a third embodiment in FIG. 4, the two separate elastic members 5c and 5D may be provided with a large number of fitting projections 17 and 18 disposed circumferentially and engageable with the holding bores 2b at the gear body 2, thereby being mounted to the gear body 2. As shown in a fourth embodiment in FIG. 5, when each elastic member 5 is molded, the gear body 2 may be inserted therein to fill into the holding bores 2b a molten material for the elastic member 5, thereby integrally mounting the elastic member 5 onto the gear body.

Figure 7:
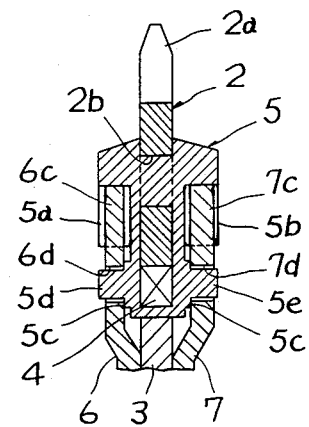
Figure 6:
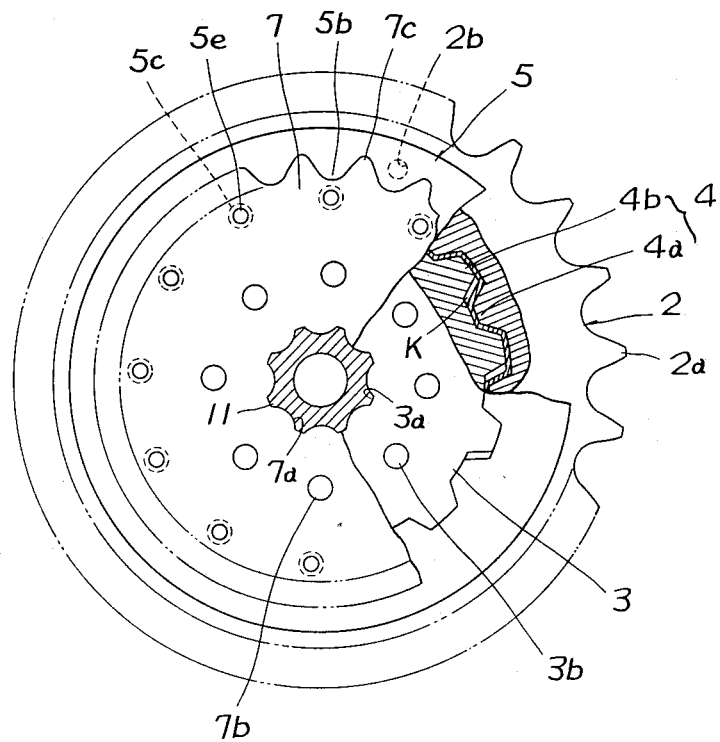
Figure 8:
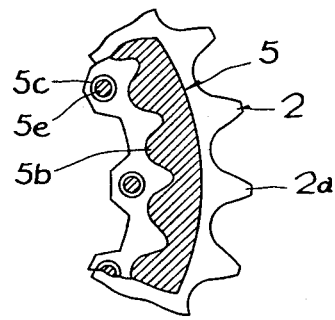

In this case, as shown by a fifth embodiment in FIGS. 6 to 8, the transmitting teeth 4a at the gear body 2 may be covered with the elastic member 5, and a plurality of fitting projections 5d and 5e having washers 5c may be integrally provided at both side surfaces of a radially inner portion of the elastic member 5 with respect to the engaging teeth 5a and 5b and disposed circumferentially and spaced from each other at predetermined distances. The reinforcement plates 6 and 7 may be provided with fitting bores 6d and 7d slightly larger in diameter than the fitting projections 5d and 5e and corresponding thereto respectively, so that the fitting projections 5d and 5e may freely be inserted into the fitting bores 6d and 7d. In this case, the washers 5c can prevent the gear body 2 from axially vibrating. An axial contact area between the support member 3 and the elastic member 5 is small, whereby rotational resistance of support member 3, when rotating with respect to the gear body 2, can be reduced. Also, when the driving force of the crank 1 is transmitted from the support member to the gear body 2, the engaging teeth 5a and 5b of elastic member 5 each are deflected to an extent corresponding to a gap between each fitting projection 5d or 5e and each fitting bore 6d or 7d, and thereafter, the fitting projections 5d and 5e and engaging teeth 5a and 5b can be deflected together, whereby the driving force transmitted to the elastic member 5 can be dispersed to the engaging teeth 5a and 5b and fitting projections 5d and 5e, thus reducing fatigue thereof and increasing the durability of the elastic member 5. Also, since part of elastic member 5 is interposed between the transmitting teeth 4a of gear body 2 and transmitting teeth 4b of support member 3, when the driving force is transmitted from the transmitting teeth 4b to teeth 4a, teeth 4b and 4a do not directly abut against each other, thus avoiding generation of sounds which would otherwise result from such abutting. Also, when the bicycle is running, the invention reduces transmission vibrations from the support member 3 to a driving chain engaging with the gear body 2 and also from the chain to the pedals mounted to the crank 1.

In an embodiment in which the driving gear constructed as described is applied to the crank 10, the mounting bore 3a at the support member 3 is fitted onto the fitting portion 11a of crank shaft 11, whereby the support member 3 is coupled thereto so as to be unable to rotate with respect to crank shaft 11. An insertion bore of the crank arm 12 is fitted onto the fitting portion 11a and a tightening bolt 13 screws with a threaded bore at the center of the shaft end, thereby fixing the support member 3 and crank arm 12 to the crank shaft 11.

When the chain is stretched across the front driving gear and a rear driving gear and the driving force of the crank 10 is transmitted to the rear wheel through the front and rear driving gears so as to drive the bicycle, the driving force when the pedalling starts is at first transmitted from the crank 10 to the elastic member 5 through the support member 3 and reinforcement plates 6 and 7, so that the elastic member 3 and reinforcement plates 6 and 7, so that the elastic member 5 is elastically deformed to an extent corresponding to the gap K at the driving force transmission unit provided between the gear body 2 and support member 3 and the support member 3 rotates relative to the gear body 2 to an extent corresponding to the gap K. Accordingly, the elastic deformation of elastic member 5 can buffer an impact caused by the driving force and the cyclist experiences a good feel in pedalling.

Thereafter, the elastic member 5, when elastically deformed, absorbs the gap K at the driving force transmission unit and simultaneously the transmitting teeth 4a and 4b thereat engage with each other to directly transmit the driving force to the gear body 2. Accordingly, the elastic member 5 is not deformed until it reaches its elastic limit and does not depend on the intensity of the driving force. Thus, the elastic member 5 can be deformed in a range of its non-elastic-limit to buffer the impact caused by the driving force, thereby reducing fatigue in the elastic member and increasing the durability thereof. Also, when the pedalling stops, the elastic member 5 is elastically deformed or restored by its elastic restoration forces so that the support member 3 rotates to an extent corresponding to the gap K, thereby compensating the gap K.

In addition, in the above embodiments, the driving force transmission 4 is formed in a toothed shape, but its construction is not particularly limited to the above-described structure.

Alternatively, the support member 3 and reinforcement plates 6 and 7 may be integral into a single plate to form a one-piece construction. Also alternatively, one reinforcement plate 6 or 7 only may be attached to the support member 3. Also, the support member 3 may alternatively be mounted to a boss of crank arm 12 through, for example, caulking, integral (one-piece) with the boss thereof, or supported to a crank shaft at a crank formed of the crank shaft and crank arm integral (one-piece) with each other, thereby restraining the rotation of the support member with respect to the crank shaft by use of a locking projection provided at the crank arm. Thus, the construction of support member 3 and its mounting construction to the crank 10 are not particularly limited to the above-described structures.

Alternatively, the elastic member 5 may be mounted on the support member 3 and formed of a coil spring. Thus, the construction of elastic member 5 and the absorbing means for the gap K are not particularly limited to the above-described structures.

Also, the driving gear of the invention may alternatively be a rear driving gear mounted to a rear hub. In this case, the driving force is transmitted from the front driving gear to the gear body of the rear driving gear through the chain, with the elastic member 5 being deformed to an extent corresponding to gap K so as to absorb it and simultaneously with the transmitting teeth 4a and 4b engaging with each other to rotate the support member 3.

Also, when the present invention is applied to the rear driving gear, the support member 3 may be mounted directly to the rear hub and also to a driving member supported rotatably to the rear hub through a one-direction rotating transmission mechanism.

Figure 9:
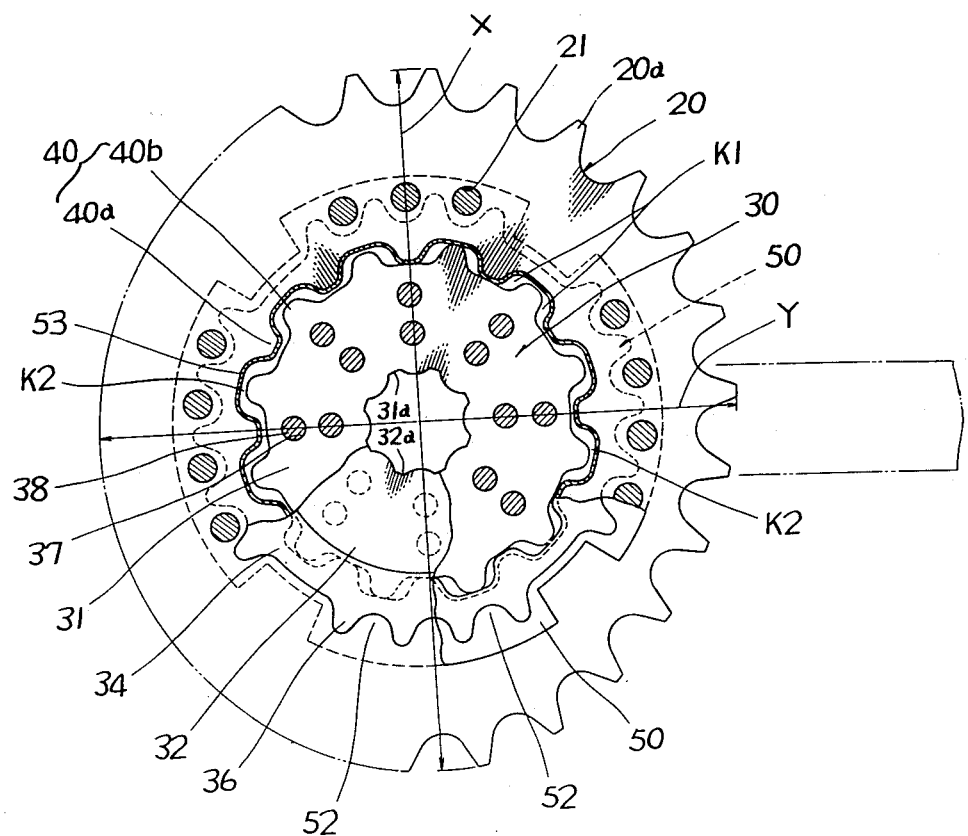
FIG. 9 is a partially cutaway front view of a sixth embodiment.
Figure 10:
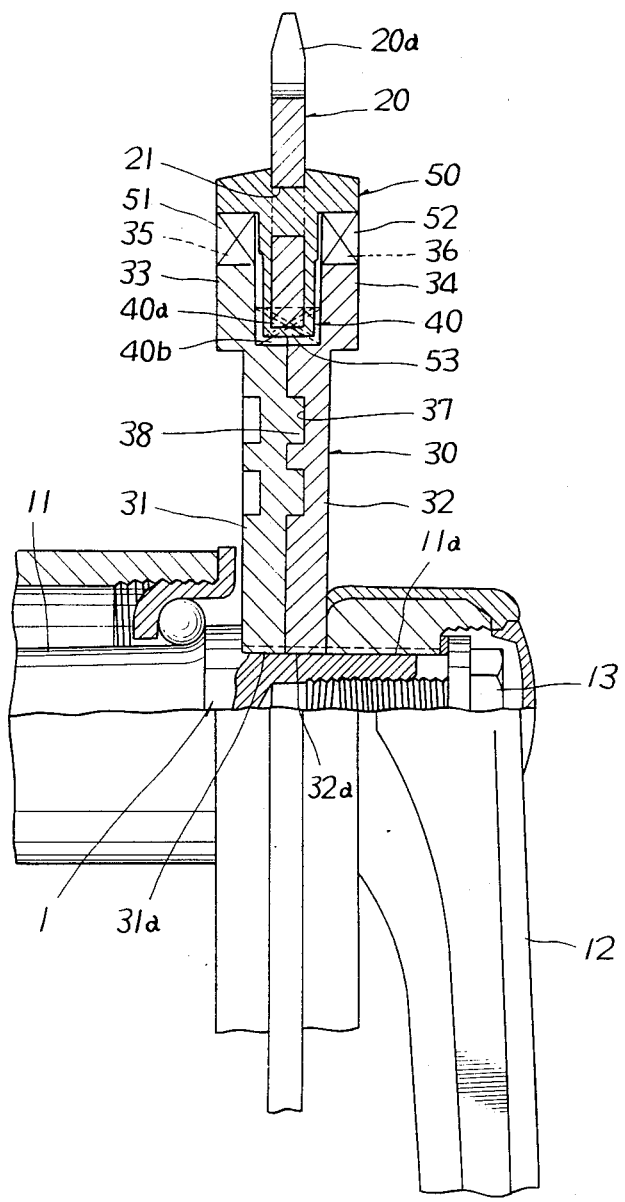
FIG. 10 is an enlarged longitudinal sectional side view of the sixth embodiment mounted on the crank.

Furthermore, the aforesaid embodiments include the round gear bodies 2 respectively, but the present invention is also applicable to an elliptic or a substantially elliptic gear body as shown in FIGS. 9 and 10.

A sixth embodiment of the driving gear of the invention shown in FIGS. 9 and 10 is provided with an elliptic gear body 20 having a major axis X and a minor axis Y, having at its outer periphery a large number of teeth 20a, and at its center a through bore; and a support member 30 inserted into the through bore to support the gear body 20 and comprising a pair of discs 31 and 32 having at their centers mounting bores 31a and 32a. A driving force transmission 40, for transmitting the driving force from the support member 30 to the gear body 20, is provided between the inner surface of the center bore at the gear body 20 and the outer periphery of the support member 30. The driving force transmission is provided with a first gap K1 through which the gear body 20 and support member 30 are rotatable relative to each other by a predetermined angle and a second gap K2 through which the gear body 20, when the major axis thereof is directed vertically, is shiftable longitudinally of the bicycle. At a location shifted from the driving force transmission 40 is provided a ring-like elastic member 50 which compensates the first gap K1 and is deformed to absorb the first gap K1 when the gear body 20 rotates relative to the support member 30, thereby enabling the driving force to be transmitted from the driving force transmission 40.

The driving force transmission 40 is composed of first transmitting teeth 40a of spline-like shape provided at the inner surface of the through bore at the gear body 20 and second transmitting teeth 40b of spline shape provided at the outer periphery of the support member 30, in other words, at the outer peripheries of the discs 31 and 32. First gap K1 is provided between the engaging surfaces of the transmitting teeth 40a and 40b as shown in FIG. 9, with second gap K2 being provided between the inner surface of the transmitting teeth 40a and the outer surface of teeth 40b. In other words, the top land and bottom land of each first transmitting tooth of gear body 20 are formed along the addendum circle and the dedendum circle and the top land is smaller in circumferential length than the bottom land at each tooth 40a. Each top land and bottom land of second transmitting teeth 40b of support member 30 are formed along the ellipses each having a major axis corresponding to a diameter of the dedendum circle of the first transmitting teeth 40a and a minor axis smaller to an extent corresponding to the second gap K2 than the dedendum circle of the same. Also, at the second transmitting teeth 40b, each bottom land is larger in circumferential length than each top land so that the first gap K1 is provided between the circumferentially opposite surfaces of the respective teeth 40a and 40b, the second gap K2 being provided between the respective bottom lands of the first teeth 40a and the respective top lands at the minor axis side of the second teeth 40b. In addition, the top lands of each transmitting tooth 40a and 40b are made to have the same level.

The support member 30 comprises a pair of discs 31 and 32 attached to each other and is provided at its outer periphery with the second transmitting teeth 40b. the discs 31 and 32 are provided at their outer peripheries with extensions 33 and 34 extending radially outwardly through stepped portions, the gear body 20 being interposed between the extension 33 and 34 to prevent the gear body 20 from axially moving. Also, a large number of engaging teeth 35 and 36 engageable with the elastic member 50 are circumferentially provided at the outer peripheries of the extensions 33 and 34. In addition, the two discs 31 and 32 are coupled through a plurality of coupling projections 38 brought into press contact with a plurality of coupling bores 37.

The elastic member 50 of synthetic resin or rubber is ring-like-shaped and has engaging teeth 51 and 52 engageable with the engaging teeth 35 and 36 with no gap formed therebetween so as to sandwich the gear body 20. The driving force of the crank 10 is transmitted from the support member 30 to the elastic member 50 through engagement of the teeth 51 and 52 with teeth 35 and 36, thereby deflecting the teeth 51 and 52 of elastic member 50. In addition, elastic member 50, as shown in FIG. 10, is preferably injection-molded to cover the first transmitting teeth 40a and both the side surfaces at the center side of the gear body 20 with the aforesaid material smaller in thickness, thereby forming between the transmitting teeth 40a and 40b a thin buffer 53 held to the gear body 20 and scarcely deflectable. In this case, the gaps K1 and K2 can be held surely. In other words, the first transmitting teeth 40a are formed smaller to an extent corresponding to the thickness of buffer 53. In a case where the elastic member 50 is formed to hold therethrough the gear body 20, it is preferable that the gear body 20 is provided with a plurality of through bores 21, so that when the elastic member 50 is molded, the molten material is filled into the through bores 21 to raise the holding strength. Incidentally, the mounting means of the elastic member 50 to the gear body 20 is not particularly limited and the buffer 53 is not indispensable.

Referring to FIG. 10, the mounting bores 31a and 32a at the support member 30 are fitted onto the fitting portion 11a of crankshaft 11, and support member 30 is fitted thereto not rotatably relative thereto. A tightening bolt 13 is screwably tightened into a threaded bore provided at the center of the end face of crankshaft 11, thereby fixing the support member 30 together with the crank arm 12 to the crank shaft 11.

A transmitting annulus C comprising a driving chain engages with the front driving gear mounted to the crank 10 and the rear driving gear mounted to the rear hub and the driving force of the crank 10 to the rear wheel through the front and rear gears transmitting annulus C drives the bicycle. In this case, similarly to the first embodiment, the driving force, when the pedalling starts, is at first transmitted from the crank 10 to the elastic member 50 through the support member 30 so that the elastic member 30 is elastically deformed to an extent corresponding to the first gap K1 at the driving force transmission 40 and the support member 30 rotates to an extent corresponding to the same, thereby buffering the impact caused by the driving force and yielding a good pedalling feel to the cyclist.

Next, simultaneously with the elastic member 50 being elastically deformed to absorb the first gap K1, the transmitting teeth 40a and 40b engage with each other so that the driving force is transmitted therefrom directly to the gear body 20, whereby the elastic member 50 is deformed always in a range of no elastic limit to buffer the impact caused by the driving force, resulting in less fatigue and more durability of the elastic member 50. Also, when the pedalling stops, the elastic member 50 is elastically restored to its original shape and the support member 30 rotates with respect to the gear body 20 to an extent corresponding to the first gap K1 so as to maintain the gap K1.

Also, the buffer 53 integral with the elastic member 50 is interposed between the first and second transmitting teeth 40a and 40b, whereby when the driving force is transmitted from the second transmitting teeth 40b to the first transmitting teeth 40a, these teeth 40b and 40a do not directly contact with each other, thereby generating no sounds.

The sixth embodiment is characterized in that when the major axis X of the gear body 20 is directed vertically, the gear body 20 is displacable through the gap K2 rearwardly of the bicycle to an extent corresponding to the second gap K2 with respect to the support member 30. Accordingly, in FIG. 11, there is provided a second gap K2 at the rear side with respect to the support 3.

Figure 11:
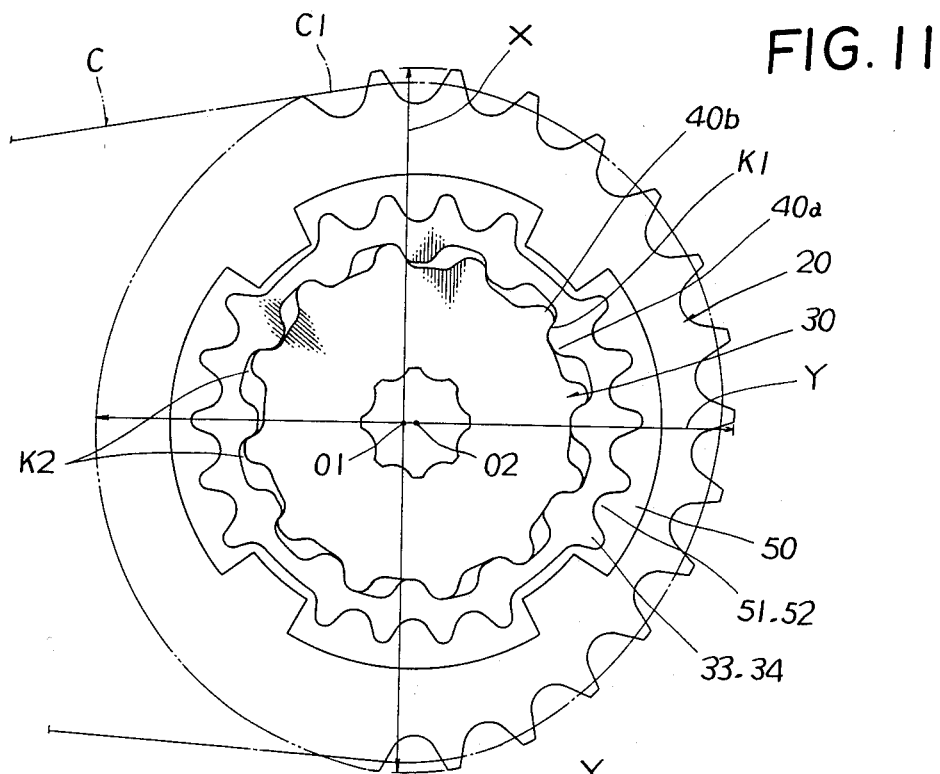
FIGS. 11 and 12 illustrate operation of the driving gear, from which a support member is partially omitted.

When the major axis X of gear body 20 is turned horizontally from the vertical state in FIG. 11, the driving force acting on the driving side C1 of transmitting annulus C biases the gear body 20 toward the center to move forwardly with respect to the support member 30. In other words, the center 01 of the gear body 20, while approaching the center 02 of the support member 30, is displaced along the vertical line passing through center 02 and just downwardly of the center 02, so that the gear body 20 is displaced forwardly to a maximum extent corresponding to the second gap K2 with respect to the support member 30. Hence, a distance between the center of the rear driving gear and that of the front driving gear can be the most suitable length, thereby applying to the transmitting annulus C the most suitable tension.

Figure 12:
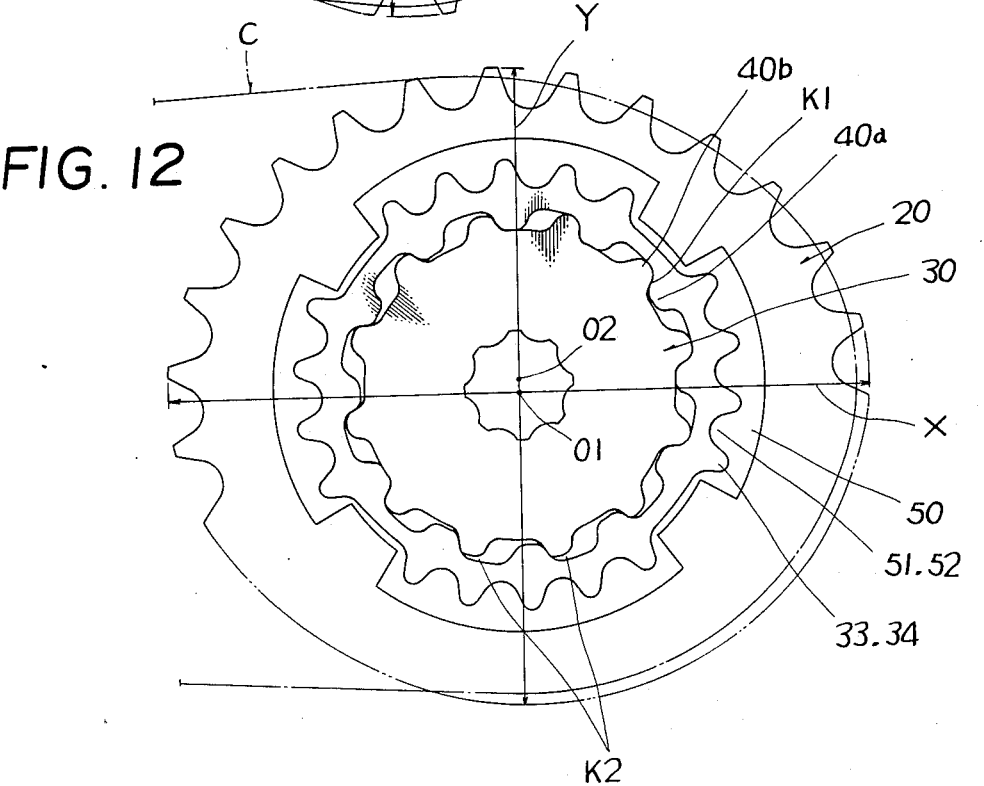

Next, when the major axis of the gear body 20 is turned vertically as shown in FIG. 11 from the horizontal state in FIG. 12, the center 01 of the gear body shifts rearwardly with respect to the center 02 of the support member so that the gear body 20 shifts to a maximum extent rewardly to an extent corresponding to the second gap K2 with respect to the center 02 of the support member, with the gear body 20 shifting rearwardly to a maximum extent and corresponding to the second gap K2. Hence, a distance between the center of the rear driving gear and that of the front driving gear is reduced corresponding to the second gap K2, thereby avoiding increasing the tension. Hence, tension of the annulus C varies little despite the elliptic shape of gear body 20.

Also, when the gear body 20 moves with respect to the support member 30, the engaging teeth 51 and 52 of elastic member 50 are deflected, thereby relieving an unpleasant feeling of the cyclist so as to obtain a good pedalling feel. Since the buffer 53 integral with the elastic member 50 is interposed between the inner surface of first transmitting teeth 40a and the outer surfaces of second transmitting teeth 40b, when the gear body 2 moves to an extent corresponding to the second gap K2 with respect to the second gap K2, the first transmitting teeth 40a do not abut directly against the second transmitting teeth 40b, thereby generating no sounds. Also, when the bicycle vertically vibrates during running, transmission of vibrations from the support member 30 to the annulus and also to the pedal therefrom are minimized.

Alternatively, the teeth 2a or 20a at the gear body 2 or 20 may be formed to engage with the tooth belt.

As seen from the above, the driving gear of the invention is provided between the gear body 2 or 20 and the support member 3 or 30 with (1) a driving force transmission 4 or 40, at the driving force transmission 4 or 40 with the gap K or K1 through which the gear body 2 or 20 and support member 3 or 30 are rotatable relative to each other by a predetermined angle, and (2) at a position shifted from the driving force transmission 4 with an elastic member 5 or 50 which compensates the gap K or K1 and is elastically deformed when the gear body 2 or 20 rotates relative to the support member 3 or 30 so as to absorb the gap K or K1 and enable the driving force to be transmitted from the driving force transmission 4 or 40. Therefore, when pedalling starts, the driving force elastically deforms the elastic member 5 or 50 to an extent corresponding to the gap K or K1, thereby buffering the impact caused by the initial driving force and directly transmitting the driving force from the driving force transmission 4 or 40 to the gear body 2 or 20 to the support member 3 or 30. Hence, the elastic member 5 or 50 has largely reduced fatigue and increased durability.

Also, with respect to an elliptic gear, the driving force transmission 40 is provided with the first gap K1 and the second gap K2 through which the gear body 20 is displaceable longitudinally of the bicycle with respect to the support member 30 when the major axis of gear body 20 is directed vertically, whereby the aforesaid effect is obtained and variations in the chain tension or the belt tension during the bicycle's running can be reduced thereby preventing the transmitting annulus, such as the chain or the belt, from being subjected to an excessive force, or avoids lowering of the transmission efficiency due to lowering of the tension.

Although several embodiments have been described, they are merely exemplary of the invention and not to be construed as limiting, the invention being defined solely by the appended claims.

What is claimed is:
1. A driving gear for a bicycle comprising:
   a substantially ring-shaped gear body having a plurality of teeth at its outer periphery;
   a support member supporting said gear body;
   a driving force transmission unit disposed between said gear body and said support member for transmitting a driving force from one of said gear body and said support member to the other, said driving force transmission unit including a gap comprising a rotation enabling means for enabling said gear body and said support member to rotate relative to each other by a predetermined angle corresponding to said gap, and
   an elastic member disposed between said gear body and said support member and spaced apart from said driving force transmission unit, said elastic member comprising means for elastically deforming to an extent of said predetermined angle when said gear body and said support member rotate relative to each other, said driving force being transmitted from said driving force transmission unit after said elastic member has deformed to said extent of said predetermined angle.

2. A driving gear for a bicycle according to claim 1, wherein said support member comprises a disc and is disposed such that its outer periphery is positioned opposite to an inner periphery of a center bore of said gear body, said driving force transmission unit comprising transmitting teeth provided between said outer periphery of said support member and said inner periphery of said gear body for transmitting said driving force, said rotation a gap being provided between adjacent engageable ones of said transmitting teeth, said support member comprising an engaging portion at a location radially and axially displaced with respect to said outer periphery of said support member, said engaging portion being engageable with said elastic member, and said elastic member comprising an engaging portion engageable with said engaging portion of said support member and fixed to said gear body.

3. A driving force for a bicycle according to claim 2, wherein said support member is provided at an axially lateral side thereof with at least one reinforcement plate having a larger diameter than said outer periphery of said support member, said reinforcement plate being provided at its outer periphery with an engaging portion engageable with said elastic member.

4. A driving gear for a bicycle according to claim 2, wherein said support member is provided at both axial sides thereof and radially displaced with respect to said transmitting teeth of said driving force transmission unit with a pair of engaging portions engageable with said elastic member.

5. A driving force for a bicycle according to claim 4, wherein said support member is provided at both said axial sides thereof with a pair of reinforcement plates each having a larger diameter than said outer periphery of said support member, said reinforcement plates each being provided at an outer periphery thereof with an engaging portion engageable with said elastic member.

6. A driving force for a bicycle according to claim 4, wherein said elastic member is provided with a pair of engaging portions engageable with said engaging portions provided at said outer peripheries of said reinforcement plates.

7. A driving gear for a bicycle according to claim 4, wherein said elastic member is provided with engaging portions engageable with said engaging portions of said support member and at locations radially inward with respect to said engaging portions of said elastic member with a plurality of fitting projections projecting axially outwardly of said elastic member, said support member being provided with engaging portions engageable with said engaging portions of said elastic member and fitting bores positioned radially inwardly of said engaging portions of said support member and said elastic member and receiving said fitting projections respectively.

8. A driving gear for a bicycle according to claim 4, wherein said elastic member is provided with a cover for covering said transmitting teeth of said gear body.

9. A driving gear as in claim 1, wherein said gear body has an eliptic shape and includes a major axis and a minor axis, said driving gear further comprising a longitudinal displacement enabling means for enabling said gear body, when said major axis of said gear body is directed vertically, to be displaced longitudinally of the bicycle with respect to said support member.

10. A driving gear for a bicycle as in claim 9, wherein said gap is provided between adjacent engageable transmission members of said driving force transmission unit and said longitudinal displacement enabling means comprises another gap provided between adjacent engageable ones of said transmission members to enable said gear body to be displaced longitudinally of the bicycle with respect to said support members.

11. A driving gear for a bicycle according to claim 10, wherein said support member comprises a disc and is provided at its outer periphery through a stepped portion with a pair of extensions extending radially outwardly of said support member, said gear body is interposed between said extensions, said driving force transmission unit is disposed between an inner periphery of a center bore of said gear body and said outer periphery of said support member, said extensions include engaging portions engageable with said elastic member at an outer periphery of said extensions, and said elastic member is provided with engaging portions engageable with said engaging portions of said support member so as to be fixed relative to said gear body.

* * * * *